United States Patent
Okada et al.

(12) 
(10) Patent No.: US 6,343,141 B1
(45) Date of Patent: *Jan. 29, 2002

(54) SKIN AREA DETECTION FOR VIDEO IMAGE SYSTEMS

(75) Inventors: Hiroyuki Okada, Atlantic Highlands; Jonathan David Rosenberg, Morganville, both of NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/727,862

(22) Filed: Oct. 8, 1996

(51) Int. Cl.[7] .............................. G06K 9/00; H04N 1/46; H04N 9/74; H04N 9/64
(52) U.S. Cl. ..................... 382/118; 382/166; 382/165; 358/539; 358/538; 358/6; 348/587; 348/652; 348/655
(58) Field of Search .............................. 382/118, 166, 382/165, 162; 355/362; 348/587, 652, 655, 703, 647; 358/539, 538

(56) References Cited

U.S. PATENT DOCUMENTS

| | | | |
|---|---|---|---|
| 5,327,228 A | * 7/1994 | Satyanarayana et al. | 348/647 |
| 5,430,809 A | 7/1995 | Tomitaka | 382/173 |
| 5,477,345 A | 12/1995 | Tse | 358/500 |
| 5,488,429 A | 1/1996 | Kojima et al. | 348/653 |
| 5,550,928 A | * 8/1996 | Lu et al. | 382/118 |
| 5,557,430 A | 9/1996 | Isemura et al. | 358/501 |

* cited by examiner

*Primary Examiner*—Edward Coles
*Assistant Examiner*—Twyler Lamb

(57) ABSTRACT

An apparatus for detecting skin areas in video sequences is disclosed. The apparatus is configured to include a shape locator and a tone detector. The shape locator analyzes the input video sequences to identify the edges of all the objects in a video frame and determine whether such edges approximate the outline of a predetermined shape that is likely to contain a skin area. Once objects likely to contain skin areas are located by the shape locator, the tone detector examines the picture elements (pixels) of each located object to determine if such pixels have signal energies that are characteristic of skin areas. The tone detector then samples pixels that have signal energies which are characteristic of skin areas to determine a range of skin tones and compares the range of sampled skin tones with the tones in the entire frame to find all matching skin tones. An eyes-nose-mouth (ENM) region detector is optionally incorporated between the shape locator and the tone detector to identify the location of an ENM region on an object that is likely to be a face, so as to improve the accuracy of the range of skin tones that are sampled by the tone detector.

43 Claims, 3 Drawing Sheets

SKIN AREA DETECTION FOR VIDEO IMAGE SYSTEMS

FIELD OF THE INVENTION

The present invention to a low bit-rate communication system for multimedia applications, such as a video teleconferencing system, and more particularly, to a method of, and system for, identifying skin areas in video images.

Description of the Related Art

The storage and transmission of full-color, full-motion images is increasingly in demand. These images are used, not only for entertainment, as in motion picture or television productions, but also for analytical and diagnostic tasks such as engineering analysis and medical imaging.

There are several advantages to providing these images in digital form. For example, digital images are more susceptible to enhancement and manipulation. Also, digital video images can be regenerated accurately over several generations with only minimal signal degradation.

On the other hand, digital video requires significant memory capacity for storage and equivalently, it requires a high-bandwidth channel for transmission. For example, a single 512 by 512 pixel gray-scale image with 256 gray levels requires more than 256,000 bytes of storage. A full color image requires nearly 800,000 bytes. Natural-looking motion requires that images be updated at least 30 times per second. A transmission channel for natural-looking full color moving images must therefore accommodate approximately 190 million bits per second. However, modern digital communication applications, including videophones, set-top-boxes for video-on-demand, and video teleconferencing systems have transmission channels with bandwidth limitations, so that the number of bits available for transmitting video image information is less than 190 million bits per second.

As a result, a number of image compression techniques such as, for example, discrete cosine transformation (DCT) have been used to reduce the information capacity required for the storage and transmission of digital video signals. These techniques generally take advantage of the considerable redundancy in any natural image, so as to reduce the amount of data used to transmit, record, and reproduce the digital video images. For example, if the video image to be transmitted is an image of the sky on a clear day, the discrete cosine transform (DCT) image data information has many zero data components since there is little or no variation in the objects depicted for such an image. Thus, the image information of the sky on a clear day is compressed by transmitting only the small number of non-zero data components.

One problem associated with image compression techniques, such as discrete cosine transformation (DCT) is that they produce lossy images, since only partial image information is transmitted in order to reduce the bit rate. A lossy image is a video image which contains distortions in the objects depicted, when the decoded image content is compared with the original image content. Since most video teleconferencing or telephony applications are focused toward images containing persons rather than scenery, the ability to transmit video images without distortions is important. This is because a viewer will tend to focus his or her attention toward specific features (objects) contained in the video sequences such as the faces, hands or other skin areas of the persons in the scene, instead of toward items, such as, for example, clothing and background scenery.

In some situations, a very good rendition of facial features contained in a video sequence is paramount to intelligibility, such as in the case of hearing-impaired viewers who may rely on lip reading. For such an application, decoded video image sequences which contain distorted facial regions can be annoying to a viewer, since such image sequences are often depicted with overly smoothed-out facial features, giving the faces an artificial quality. For example, fine facial features such as wrinkles that are present on faces found in an original video image tend to be erased in a decoded version of a compressed and transmitted video image, thus hampering the viewing of the video image.

Several techniques for reducing distortions in skin areas of images that are transmitted have focused on extracting qualitative information about the content of the video images including faces, hands and the other skin areas of the persons in the scene, in order to code such identified areas using fewer data compression components. Thus, these identified areas are coded and transmitted using a larger number of bits per second, so that such areas contain fewer distorted features when the video images are decoded.

In one technique, a sequence of video images is searched for symmetric shapes. A symmetric shape is defined as a shape which is divisible into identical halves about an axis of symmetry. An axis of symmetry is a line segment which divides an object into equal parts. Examples of symmetrical shapes include squares, circles and ellipses. If the objects in a video image are searched for symmetrical shapes, some of the faces and heads shown in the video image are identifiable. Faces and heads that are depicted symmetrically, typically approximate the shape of an ellipse and have an axis of symmetry vertically positioned between the eyes, through the center of the nose and halfway across the mouth. Each half-ellipse is symmetric because each contains one eye, half of the nose and half of the mouth. However, only those faces and heads that are symmetrically depicted in the video image are recognizable, precluding the identification of heads and faces when viewed in profile (turned to the left or turned to the right), since a face or head viewed in profile does not contain an axis of symmetry. Hands and other skin areas of the persons in the scene are similarly not symmetric objects and are also not recognizable using a symmetry based technique.

Another technique, searches the video images for specific geometric shapes such as, for example, ellipses, rectangles or triangles. Searching the video images for specific geometric shapes can often locate heads and faces, but still cannot identify hands and other skin areas of persons in the scene, since such areas are typically not represented by a specified geometric shape. Additionally, partially obstructed faces and heads which do not approximate a specified geometric shape are similarly not recognizable.

In yet another technique, a sequence of video images is searched using color (hue) to identify skin areas including heads, faces and hands. Color (hue) based identification is dependent upon using a set of specified skin tones to search the video sequences for objects which have matching skin colors. While the color (hue) based techniques are useful to identify some hands, faces or other skin areas of a scene, many other such areas can not be identified since not all persons have the same skin tone. In addition, color variations in many skin areas of the video sequences will also not be detectable. This is because the use of a set of specified skin tones to search for matching skin areas precludes color based techniques from compensating for unpredictable changes to the color of an object, such as variations attributable to background lighting and/or shading.

Accordingly, skin identification techniques that identify hands, faces and other skin areas of persons in a scene continue to be sought.

SUMMARY OF THE INVENTION

The present invention is directed to a skin area detector for identifying skin areas in video images and, in an illustrative application, is used in conjunction with the video coder of video encoding/decoding (Codec) equipment. The skin area detector identifies skin areas in video frames by initially analyzing the shape of all the objects in a video sequence to locate one or more objects that are likely to contain skin areas. Objects that are likely to contain skin areas are further analyzed to determine if the picture elements (pixels) of any such object or objects have signal energies characteristic of skin regions. The term signal energy as used herein refers to the sum of the squares of the luminance (brightness) parameter for a specified group of pixels in the video signal. The signal energy includes two components: a direct current (DC) signal energy and an alternating current (AC) signal energy. The color parameters of objects with picture elements (pixels) that have signal energies characteristic of skin regions are then sampled to determine a range of skin tone values for the object. This range of sampled skin tone values for the analyzed object is then compared with all the tones contained in the video image, so as to identify other areas in the video sequence having the same skin tone values. The identification of likely skin regions in objects based on shape analysis and a determination of the signal energies characteristic of skin regions is advantageous. This is because the subsequent color sampling of such identified objects to determine a range of skin tone values, automatically compensates for color variations in the object and thus skin detection is made dynamic with respect to the content of a video sequence.

In the present illustrative example, the skin area detector is integrated with but functions independently of the other component parts of the video encoding/decoding (Codec) equipment which includes an encoder, a decoder and a coding controller. In one embodiment, the skin area detector is inserted between the input video signal and the coding controller, to provide input related to the location of skin areas in video sequences, prior to the encoding of the video images.

In one example of the present invention, the skin area detector includes a shape locator and a tone detector. The shape locator analyzes input video sequences to identify the edges of all the objects in a video frame and determine whether such edges approximate the outline of a shape that is likely to contain a skin area. The shape locator is advantageously programmed to identify certain shapes that are likely to contain skin areas. For example, since human faces have a shape that is approximately elliptical, the shape locator is programmed to search for elliptically shaped objects in the video signal.

Since an entire video frame is too large to analyze globally, it is advantageous if the video frame of an input video sequence is first partitioned into image areas. For each image area, the edges of objects are then determined based on changes in the magnitude of the pixel (picture element) intensities for adjacent pixels. If the changes in the magnitude of the pixel intensities for adjacent pixels in each image area are larger then a specified magnitude, the location of such an image area is identified as containing an edge or a portion of the edge of an object.

Thereafter, identified edges or a portion of identified edges are further analyzed to determine if such edges, which represent the outline of an object, approximate a shape that is likely to contain a skin area. Since skin areas are usually defined by the softer curves of human shapes (e.g., the nape of the neck, and the curve of the chin), rigid angular borders are not typically indicative of skin areas. Thus, configurations that are associated with softer human shapes are usually selected as likely to contain skin areas. For example, since an ellipse approximates the shape of a person's face or head, the analysis of a video sequence to identify those outlines of objects which approximate ellipses, advantageously determines some locations in the video sequence that are likely to contain skin areas. Also, in the context of video conferencing, at least one person is typically facing the camera, so if one or more persons are in the room, then it is likely that an elliptical shape will be identified.

Once objects likely to contain skin areas are located by the shape locator the tone detector examines the picture elements (pixels) of each located object to determine if such pixels have signal energies that are characteristic of skin areas, then samples the range of skin tones for such identified objects and compares the range of sampled skin tones with the tones in the entire frame to determine all matching skin tones. In the present embodiment, the signal energy components (DC and AC energy components) of the luminance parameter are advantageously determined using the discrete cosine transformation (DCT) technique.

In the technique of the present invention, the discrete cosine transform (DCT) of the signal energy for a specified group of pixels in an object identified as likely to contain a skin area is calculated. Thereafter, the AC energy component of each pixel is determined by subtracting the DC energy component for each pixel from the discrete cosine transform (DCT). Based on the value of the AC energy component for each pixel, a determination is made as to whether the pixels have an AC signal energy characteristic of a skin area. If the AC signal energy for an examined pixel is less than a specified value, typically such pixels are identified as skin pixels. Thereafter, the tone detector samples the color parameters of such identified pixels and determines a range of color parameters indicative of skin tone that are contained within the region of the object.

The color parameters sampled by the tone detector are advantageously chrominance parameters, $C_r$ and $C_b$. The term chrominance parameters as used herein refers to the color difference values of the video signal, wherein $C_r$ is defined as the difference between the red color component and the luminance parameter (Y) of the video signal and $C_b$ is defined as the difference between the blue color component and the luminance (Y) parameter of the video signal. The tone detector subsequently compares the range of identified skin tone values from the sampled object with the color parameters of the rest of the video frame to identify other skin areas.

The skin area detector of the present invention thereafter analyzes the next frame of the video sequence to determine the range of skin tone values and identify skin areas in the next video frame. The skin area detector optionally uses the range of skin tone values identified in one frame of a video sequence to identify skin areas in subsequent frames of the video sequence.

The skin area detector optionally includes an eyes-nose-mouth (ENM) region detector for analyzing some objects which approximate the shape of a person's face or head, to determine the location of an eyes-nose-mouth (ENM) region. In one embodiment, the ENM region detector is inserted between the shape locator and the tone detector to identify the location of an ENM region and use such a region as a basis for analysis by the tone detector. The eyes-nose-mouth (ENM) region detector utilizes symmetry based methods to identify an ENM region located within an object which approximates the shape of a person's face or head. It is advantageous for the eyes-nose-mouth (ENM) region to be identified since such a region of the face contains skin color parameters as well as color parameters other than skin tone parameters, including for example, eye color parameters, eyebrow color parameters, lip color parameters and hair color parameters. Also, the identification of the eye-nose-mouth (ENM) region reduces computational complexity, since skin tone parameters are sampled from a small region of the identified object.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION

Figure 1:
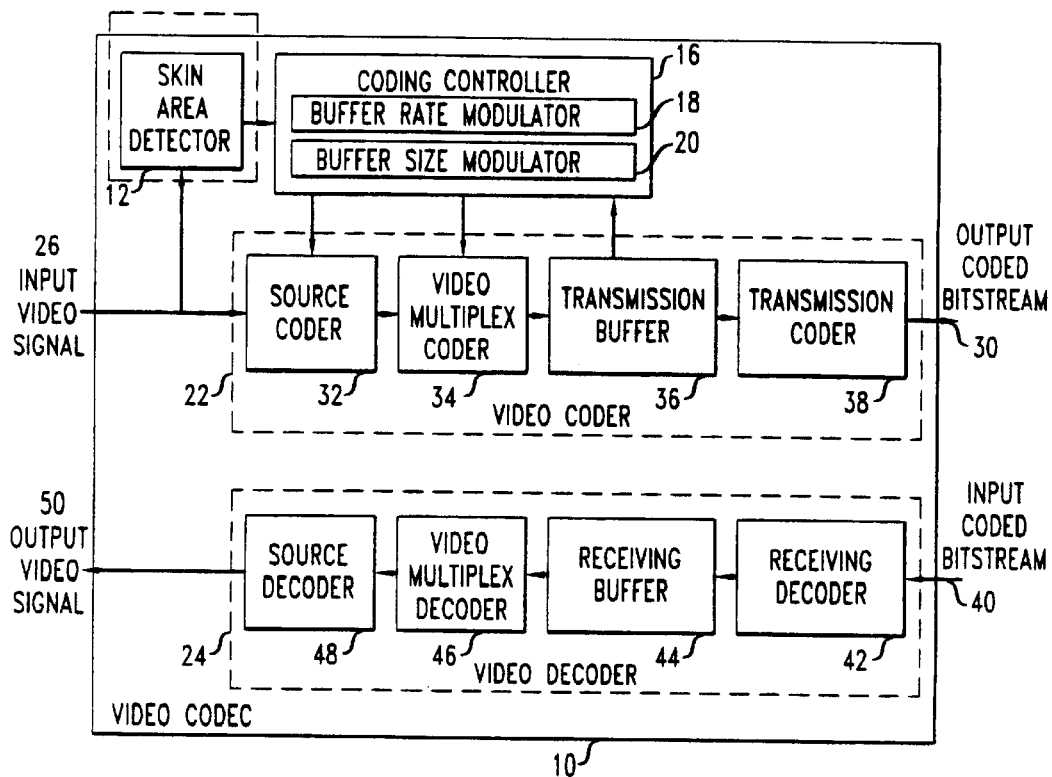
FIG. 1 is a block diagram of a video coder/decoder (Codec) embodying an illustrative application of the principles of the present invention.

FIG. 1 shows an illustrative application of the present invention wherein a skin area detector 12 is used in conjunction with a video coding/decoding system such as, for example, video codec 10 (coder/decoder). Video coding/decoding systems such as video codec 10 are utilized primarily in the teleconferencing industry for the coding and decoding of video image sequences based on image compression techniques. An example of an image compression technique useful for the coding and decoding of video image sequences includes the Discrete Cosine Transform (DCT) method, described in ITU-T Recommendation H.263 ("Video coding for narrow communication channels"). It should be understood, of course, that the present invention is useful with video systems other than a video coder/decoder (codec), such as, for example motion picture editing equipment. Indeed, the present invention is applicable for use with any equipment to which a digital color video signal is input.

One embodiment of the present invention is illustrated in FIG. 1, which shows skin area detector 12 (enclosed with dashed lines), located within video codec 10. Skin area detector 12 is integrated with, but functions independently from, the other component parts of video codec 10. For example, video codec 10 includes additional component parts such as, video coder 22, video decoder 24 and coding controller 16. Such component parts will be discussed in conjunction with the following explanation of the operation of video codec 10.

Figure 2:
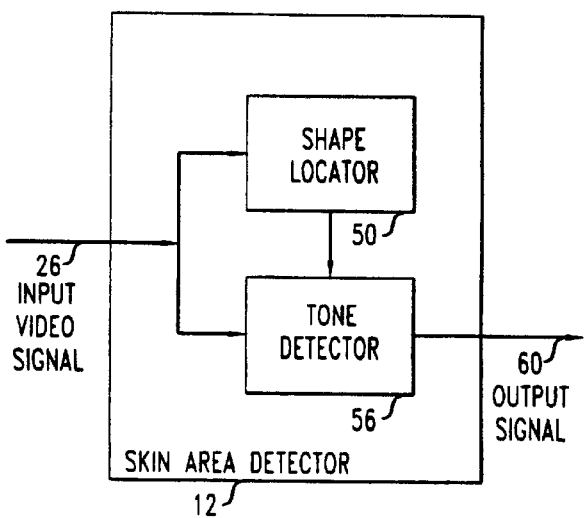
FIG. 2 is a block diagram of the skin area detector of the present invention.

Skin area detector 12, shown in greater detail in the block diagram of FIG. 2, includes the ocator 50 and a tone detector 56. The fuctions represented by the shape locator 50 and tone detector 56 are optionally provided through the use of either shared or dedicated hardware, including hardware capable of executing software. For example, the functions of shape locator 50 and tone detector 56 are optionally provided by a single shared processor or by a plurality of individual processors.

Also, the use of the individual functional blocks representing shape locator 50 and tone detector 56 is not to be construed to refer exclusively to hardware capable of executing software. Examples of additional illustrative embodiments for the functional blocks described above, include digital signal processor (DSP) hardware, such as the AT&T DSP16 or DSP32C, read-only memory (ROM) for storing software performing the operations discussed below, and random access memory (RAM) for storing digital signal processor (DSP) results. Very large scale integration (VLSI) hardware embodiments, as well as custom VLSI circuitry in combination with a general purpose digital signal processor (DSP) circuit are also optionally contemplated. Any and/or all such embodiments are deemed to fall within the meaning of the functional blocks labeled shape locator 50 and tone detector 56.

The present invention identifies skin areas in video image sequences. Shape locator 50 initially locates one or more likely skin areas in a video frame based on the identification of edges of all objects in the video frame and a determination of whether any of such edges approximate the outline of a predetermined shape. The analysis of edges based on approximations to predetermined shapes is important because objects that are likely to contain skin areas have a high probability of being identified. For example, in some instances a person's face or head will nearly approximate the shape of an ellipse. Thus, the analysis of a video frame to identify ellipses provides a high probability location of some skin areas.

Objects identified as likely skin areas are thereafter analyzed by tone detector 56 to determine whether the picture elements (pixels) of any such object or objects have signal energies characteristic of skin regions. The term signal energy as used in this disclosure refers to the sum of the squares of the luminance (brightness) parameter for a specified group of pixels in the video signal and includes two-energy-components: a direct current (DC) signal energy and an alternating current (AC) signal energy. The color parameters of objects with picture elements (pixels) that have signal energies characteristic of skin regions are then sampled to determine a range of skin tone (color) values for the object. The range of skin tone values for the object are then compared with all the tones contained in the video image, so as to identify other areas in the video sequence having the same skin tone values. When skin areas are identified based on an analysis of signal energies, followed by the sampling of skin tone values, skin detection is made dynamic with respect to the content of the video sequence, because the skin tone sampling of identified objects automatically compensates for unpredictable changes to the color tones of an object, such as variations attributable to background lighting and/or shading.

The component parts of both shape locator 50 and tone detector 56 are described below, with reference to FIG. 2, as part of an explanation of the operation of skin area detector 12. An input video signal 26 representing a sequence of frames corresponding to an image of an object as a function of time, is provided to shape locator 50 from a conventional video camera (not shown) such as, for example, the View Cam, manufactured by Sharp Corporation. Shape locator 50 analyzes at least one of the frames of the input video signal 26 to identify the edges of all the objects in the frame and determine if an edge or a portion of an edge approximates a shape that is likely to include a skin area. Examples of shapes that are likely to include skin areas include ellipses, arcs and curves. The term curve as used in this disclosure refers to a shape having at least a portion of an edge that is not a straight line.

Figure 3:
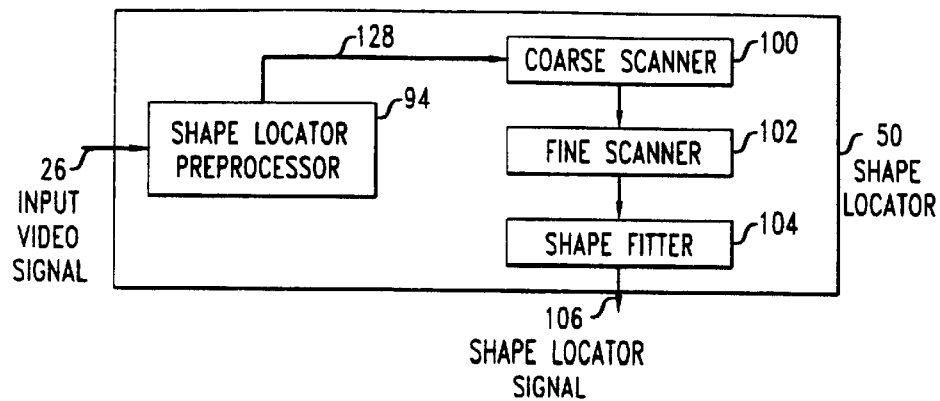
FIG. 3 shows a block diagram of the shape locator of FIG. 2.

The component parts of shape locator 50 are illustrated in FIG. 3 and include a shape location preprocessor 94 as well as a coarse scanner 100, a fine scanner 102 and a shape fitter 104. The shape fitter 104 generates a shape locator signal 106, which is provided to the tone detector 56.

Figure 4:
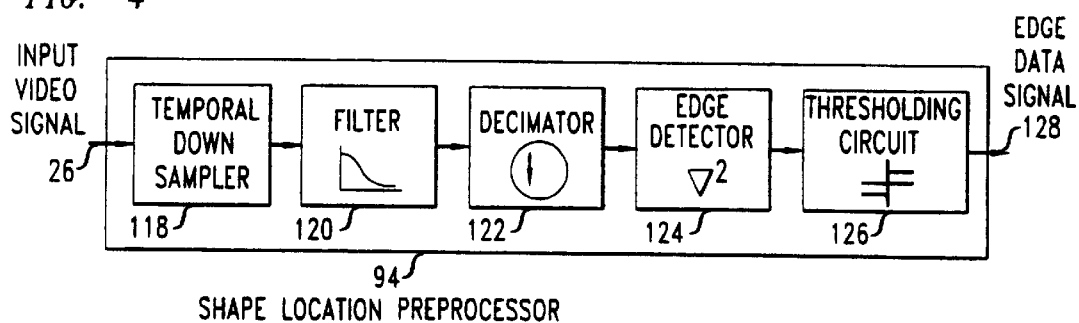
FIG. 4 is a block diagram of the preprocessor circuit of the shape locator of FIG. 3.

The shape location preprocessor 94 functions to analyze the regions of the video image to identify the edges of objects contained in the video frame. The shape location preprocessor 94 incorporates a preprocessing circuit, as illustrated in FIG. 4, including a downsampler 118, a filter 120, a decimator 122, an edge detector 124 and a thresholding circuit 126.

Temporal downsampler 118 functions to limit the number of frames of the video signal that are available for shape identification by selecting, for analysis, only a small number of frames from the total number of frames available in the input video signal 26. As an illustrative example, a typical frame rate for a video signal such as input video signal 26 approximates 30 frames per second (fps), with each successive frame containing information essentially identical to that of the previous frame. Since successive frames contain essentially identical information, it is advantageous to reduce computational complexity by selecting only a small number of frames from the video signal for shape analysis. Thus, regarding the present example, assume that the downsampler, in order to reduce computational complexity, selects only every fourth frame of the input video signal for shape analysis. As a result, the downsampler reduces the frame rate input into shape locator 50, from a rate of about 30 frames per second (fps) to a rate of about 7.5 frames per second (fps).

Filter 120 is typically a separable filter for performing spatial filtering of a downsampled video frame, having a size 360×240 pixels and with a cut-off frequency of π/c, where c is advantageously equivalent to the decimation (division) factor, discussed below. Typically, a filter such as filter 120 defines a range of frequencies. When a signal such as downsampled input video signal 26 is provided to filter 120, only those frequencies contained in the video signal that are within the range of defined frequencies for the filter are output. The frequencies contained in the video signal that are outside the range of defined frequencies for the filter, are suppressed. Examples of filter 120 include finite impulse response (FIR) filters and infinite impulse response (IIR) filters. The filtered video signal is input to decimator 122 where both the horizontal and vertical dimensions of the video image frame are partitioned into image areas having smaller predetermined sizes, for edge analysis. As an illustrative example, if a decimator such as decimator 122 has a decimation factor of c=8, and the video image frame has dimensions of 360×240 pixels, then the video image frame is partitioned into image areas with dimensions of 45×30 pixels.

Edge detector 124 performs edge detection on each of the partitioned image areas of the video image frame, searching for the edges of objects. The edge of an object in any video image frame is typically characterized by changes in the magnitude of the pixel intensities for adjacent pixels. For example, if an image area of size 3×3 pixels does not contain an edge of an object, the magnitude of the pixel intensities for adjacent pixels, representative of such an image area, are nearly equivalent, as shown in matrix A, $$A = \begin{vmatrix} 11 & 10 & 10 \\ 10 & 10 & 10 \\ 10 & 10 & 11 \end{vmatrix}$$

In contrast, if a similar image area of size 3×3 pixels, contains the edge of an object, the magnitudes of the pixel intensities for adjacent pixels, representative of such an image area, contain sharp transitions, as shown in matrix B, $$B = \begin{vmatrix} 10 & 50 & 90 \\ 50 & 50 & 90 \\ 90 & 90 & 90 \end{vmatrix}$$

Edge detectors such as, edge detector 124, utilize techniques including, Sobel operator techniques, to identify the edges of objects by summing the squares of the convolution of two-dimensional Sobel operators such as, $\delta_x$ and $\delta_y$, with the magnitudes of the pixel intensities for adjacent pixels, shown for example, in either matrix A or B, for a partitioned image area. As an illustrative example, using the Sobel operator technique, if the Sobel operators, represented in two dimensional form by the horizontal $\delta_x$ and vertical $\delta_y$ operators, described below, $$\delta_x = \begin{vmatrix} -1 & 0 & 1 \\ -2 & 0 & 2 \\ -1 & 0 & 1 \end{vmatrix} \quad \delta_y = \begin{vmatrix} 1 & 2 & 1 \\ 0 & 0 & 0 \\ -1 & -2 & -1 \end{vmatrix}$$

are convolved with the magnitudes of the pixel intensities for adjacent pixels in an image area that does not contain the edge of an object such as, for example, the pixel intensities for adjacent pixels of matrix A, as shown below:

$$\delta_{xA} = \begin{vmatrix} -1 & 0 & 1 \\ -2 & 0 & 2 \\ -1 & 0 & 1 \end{vmatrix} * \begin{vmatrix} 11 & 10 & 10 \\ 10 & 10 & 10 \\ 10 & 10 & 11 \end{vmatrix}$$

$$\delta_{yA} = \begin{vmatrix} 1 & 2 & 1 \\ 0 & 0 & 0 \\ -1 & -2 & -1 \end{vmatrix} * \begin{vmatrix} 11 & 10 & 10 \\ 10 & 10 & 10 \\ 10 & 10 & 11 \end{vmatrix}$$

the resulting convolution produces, in part, the result shown below, $\delta_{xA}=(-1\times11)+(0\times10)+(1\times10)+(-2\times10)+(0\times10)+(2\times10)+(-1\times10)+(0\times10)+(1\times11)\approx0$ $\delta_{yA}=(1\times11)+(2\times10)+(1\times10)+(0\times10)+(0\times10)+(0\times10)+(-1\times10)+(-2\times10)+(-1\times11)\approx0$ whose magnitudes approximate zero in two dimensions. In contrast, if the Sobel operators are convolved with the magnitudes of pixel intensities for adjacent pixels in an image area that contains the edge of an object such as, for example, the magnitudes of the pixel intensities for adjacent pixels, shown in matrix B, the resulting convolution produces, in part, the result shown below, $$\delta_{xB}=(-1\times10)+(0\times50)+(1\times90)+(-2\times50)+(0\times50)+(2\times90)+(-1\times90)+(0\times90)+(1\times90)\cong160$$

$$\delta_{yB}=(1\times10)+(2\times50)+(1\times90)+(0\times50)+(0\times50)+(0\times90)+(-1\times90)+(-2\times90)+(-1\times90)\cong-160$$

whose magnitudes do not approximate zero. Edge detection techniques utilizing, for example, the above described Sobel operator techniques, are performed for each of the partitioned 45×30 pixel areas of the video frame.

Thresholding circuit 126 then identifies those pixels in each 45×30 partitioned area, whose magnitude of convolved, squared and summed pixel intensities for adjacent pixels are larger than a specified value, assigning such identified pixels a non-zero numerical value. Pixels having a magnitude of convolved, squared and summed pixel intensities for adjacent pixels less than the specified value of the thresholding circuit 126, are assigned a zero numerical value. Edge data signals 128 corresponding to the non-zero pixel values are subsequently generated by the thresholding circuit 126. The incorporation of a thresholding circuit, such as, thresholding circuit 126, advantageously prevents contoured skin areas that are not edges from being misidentified as edges. This is because small variations in the magnitudes of the pixel intensities for adjacent pixels typically produces convolved, squared and summed magnitudes that are less than the specified value of the thresholding circuit 126.

Referring again to FIG. 3, the edge data signals 128 generated by the shape location preprocessor 94 are input to the coarse scanner 100 of shape locator 50. The coarse scanner 100 segments the edge data signals 128 provided by the shape location preprocessor 94, into blocks of size B×B pixels; for example, of size 5×5 pixels. Each block is then marked by the coarse scanner 100, if at least one of the pixels in the block has a non-zero value, as discussed above. The array of segmented B×B blocks is then scanned in for example, a left-to-right, top-to-bottom fashion, searching for contiguous runs of marked blocks. For each such run of marked blocks, fine scanning and shape fitting are performed. The inclusion of coarse scanner 100 as a component part of shape locator 50 is optional depending on the computational complexity of the system utilized. The fine scanner 102 scans the pixels in each contiguous run of segmented and marked B×B blocks, for example, in a left-to-right, top-to-bottom fashion, to detect the first pixel in each line of pixels that has a non-zero value and the last pixel in each line of pixels that has a non-zero value. The first and last non-zero detected pixels of each line are labeled with coordinates $(x_{start}, y)$ and $(x_{end}, y)$, respectively.

The shape fitter 104 scans the coordinates labeled $(x_{start}, y)$ and $(x_{end}, y)$ on each line of pixels. Geometric shapes of various sizes and aspect ratios stored in the memory of the shape fitter 104 that are likely to contain skin areas are then compared to the labeled coordinate areas, in order to determine approximate shape matches. Having determined a shape outline from a well fitting match of a predetermined shape that is likely to contain a skin area such as, for example, an ellipse, the shape locator 50 generates a shape location signal 106 based on the coordinates of the well-fitted shape, and provides such a shape location signal 106 to the tone detector 56.

Once shape locator 50 has identified the location of an object with a border that indicates the object is likely to contain a skin area, tone detector 56 functions to analyze whether such an object contains signal energies that are characteristic of skin regions. If the object contains signal energies that are characteristic of skin regions the tone detector 56 samples the color parameters of the object, in order to identify a range of skin tone values. The tone detector 56 then compares the identified range of skin tone values to the color parameters of the rest of the video frame to identify other areas containing the same skin tone values.

Color digital video signals contain red (R), green (G) and blue (B) color components and are typically available in a standard YUV color video format, where Y represents the luminance parameter and both U and V represent the chrominance parameters. The luminance (Y) parameter characterizes the brightness of the video image, while the chrominance (U,V) parameters define two color difference values, $C_r$ and $C_b$. The relationships between the luminance (Y) parameter, the color difference values, $C_r$ and $C_b$, and the three color components R, G and B are typically expressed as:

$$Y=0.299R+0.587G=0.114B$$

$$C_r=R-Y$$

$$C_b=B-Y$$

Figure 5:
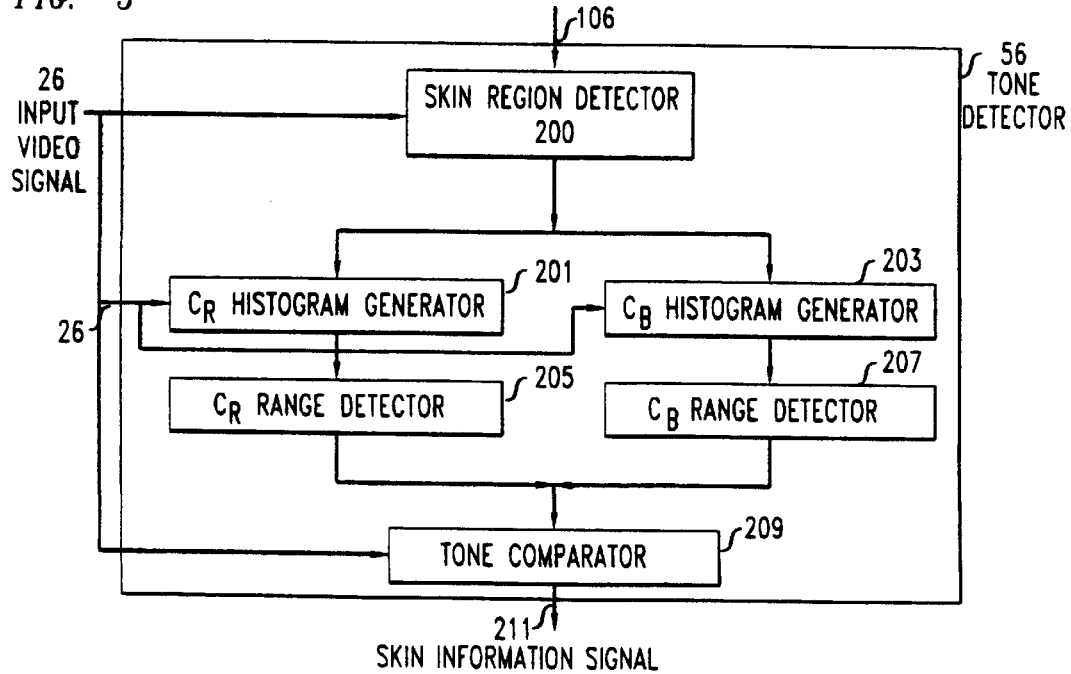
FIG. 5 shows a block diagram of the tone detector of FIG. 2.

In one embodiment of the present invention, tone detector 56, as shown in FIG. 5, includes a skin region detector 200, a $C_r$ histogram generator 201, a $C_b$ histogram generator 203, a $C_r$ range detector 205, a $C_b$ range detector 207 and a tone comparator 209.

Figure 6:
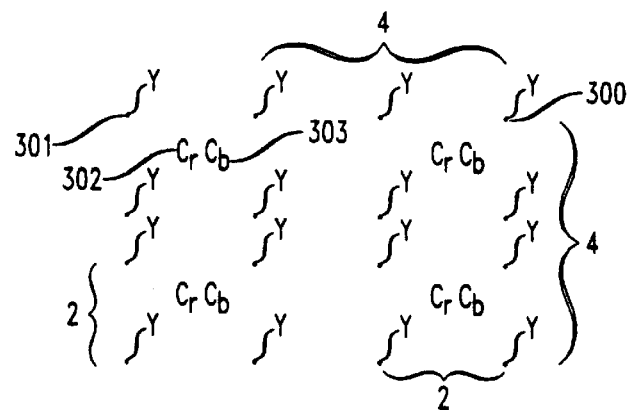
FIG. 6 illustrates a 4×4 block of pixels.

Skin region detector 200 correlates the input video signal 26 with the shape location signal 106, so that the objects identified in the video frame, by the shape locator 50 are segmented into blocks of D×D pixels. Skin region detector 200 advantageously segments the identified shape into blocks of 2×2 pixels, where D=2, in order to obtain one luminance parameter for each pixel as well as one $C_r$ value and one $C_b$ value for every block of 2×2 pixels. As an illustrative example, FIG. 6 shows a 4×4 block of pixels 300. A luminance parameter (Y) 301 is present for each pixel 300. In contrast, each block of 2×2 pixels 300 has one $C_r$ value 302 and one $C_b$ value 303, which is present at the ½ dimension in both the horizontal and vertical directions. Thus, each block of 2×2 pixels includes four luminance (Y) parameters 301, as well as one $C_r$ value 302 and one $C_b$ value 303. Such segmentation, to include only one $C_r$ value and only one $C_b$ value is important when skin tone sampling is performed for an identified object, as discussed below.

Skin region detector 200 functions to analyze which of the blocks of D×D pixels lying within the perimeter of an identified object represents skin areas by determining whether each D×D block of pixels have signal energies characteristic of a skin region. The luminance (Y) parameter of the color video signal has two signal energy components: an alternating current (AC) energy component and a direct current (DC) energy component. Skin area pixels typically have AC energy components with values less than a specified threshold energy, $T_{en}$.

In an embodiment of the present invention, skin areas are detected based on the calculation of the AC energy components for the luminance (Y) parameter of the color video signal. Methods including the discrete cosine transformation (DCT) technique, as described in ITU-T Recommendation H.263 ("Video coding for narrow communication channels") are useful for calculating the signal energies of the luminance (Y) parameter. As an illustrative example, the AC energy components and the DC energy components of the luminance parameters for each block of D×D pixels, is determined by first calculating the discrete cosine transformation (DCT) function, F(u, v) for each pixel as shown below, from equation (1)

$$F(u, v) = C(u)C(v) \sum_{i=0}^{1} \sum_{j=0}^{1} f(i, j) \cos\frac{(2i+1)u}{4}\pi \cos\frac{(2j+1)v}{4}\pi \quad (1)$$

where F(u, v) represents the discrete cosine transformation (DCT) function and C(u) and C(v) are defined as $$C(\omega) = 1/\sqrt{2} \quad \text{for } \omega = 0$$
$$C(\omega) = 1 \quad \text{for } \omega = 1, 2, 3, \ldots$$

which are summed for each pixel location F(u,v) of the block of D×D pixels. The AC signal energy, E(m,1), is then determined by subtracting the square of the direct current (DC) signal energy, $F_{m,1}$ (0,0), from the square of the discrete cosine transformation function F(u, v), as shown in equation (2)

$$E_{m,1} = \sum_{u=0}^{1}\sum_{w=0}^{1} F_{m,1}(u, v)^2 - F_{m,1}(0, 0)^2 \quad (2)$$

The AC signal energy, E (m, 1), is then compared to a threshold energy, $T_{en}$. For each D×D block of pixels, if the AC signal energy, E(m, 1), is less than a preselected threshold energy, $T_{en}$, the block of pixels is identified as a skin area, as indicated below, $E(m, 1) < T_{en}$ Skin area $E(m, 1) \geq T_{en}$ Non-skin area Typically, when a D×D block of pixels has an AC signal energy value that is less than 120,000 such a block of pixels is identified as a skin region. It is advantageous to utilize the signal energy components of the luminance parameter to determine skin areas, since non-skin areas tend to have much higher signal energy components than do skin areas. Identifying such non-skin areas and eliminating them from the color sampling process increases the probability that the color of a sampled pixel is actually a skin area pixel, and thus improves the accuracy of the range of tones to be sampled.

Once a block of D×D pixels has been identified by the skin region detector 200, as a skin region, the $C_r$ values and the $C_b$ values of the block of D×D pixels are sampled by the $C_r$ histogram generator 201 and the $C_b$ histogram generator 203, respectively. As previously discussed, it is advantageous if the blocks of D×D pixels, are 2×2 blocks of pixels, since such blocks contain only one $C_r$ value and one $C_b$ value. Both the $C_r$ histogram generator 201 and the $C_b$ histogram generator 203 then generate histograms for the sampled $C_r$ and $C_b$ values, respectively.

Once a $C_r$ histogram and a $C_b$ histogram have been generated, the range of color parameters representative of skin tone for the sampled object are determined by the $C_r$ range detector 205 and the $C_b$ range detector 207 using statistical analysis techniques. For example, with each data set the mean and mode $C_r$ and $C_b$ values are determined for each block of D×D pixels sampled. When the mean and mode $C_r$ and $C_b$ values are within some specified distance, $D_p$, of each other, such mean and mode $C_r$ and $C_b$ values are identified as representing a single peak. Thereafter, for each block of D×D pixels, if a pixel color parameter is within a predetermined distance, for example, one standard deviation, of such mean and mode $C_r$ and $C_b$ values representative of a single peak, than the pixel color parameter is included in the range of skin tone values. When the mean and mode are within a distance greater than the specified distance, $D_p$, such mean and mode $C_r$ and $C_b$ values are identified as representing two individual peaks. The pixel color parameters for blocks of D×D pixels with mean and mode $C_r$ and $C_b$ values that are representative of two individual peaks are not included in the range of skin tone values.

Based on the range of $C_r$ and $C_b$ values generated in the $C_r$ range detector 205 and the $C_b$ range detector 207, respectively, the tone comparator 209 analyzes the entire frame of the input video signal 26, to locate all other areas containing the same chrominance parameters. When such other regions are located, a skin information signal 211 denoting the location of the skin areas is generated by the tone comparator 209.

Skin area detector 12 performs the above described analysis for each frame of a video sequence or optionally analyzes a single frame and then the tone comparator 209 utilizes that range of skin tone values to identify skin areas in a specified number of subsequent frames.

Figure 7:
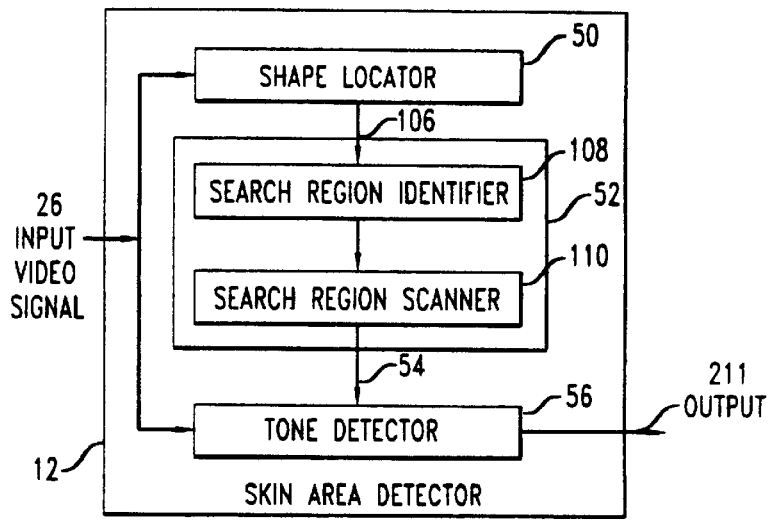
FIG. 7 shows a block diagram of the skin area detector including an eyes-nose-mouth (ENM) region detector.
Figure 8:
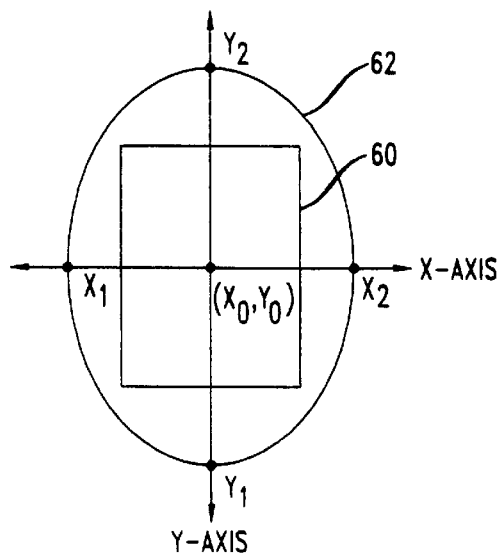
FIG. 8 illustrates a rectangular window located within an ellipse.

In the embodiment of the present invention, wherein the outline of an object or objects identified by the shape locator 50 match well fitting ellipses and before such a shape or shapes have been verified to contain skin areas, a shape location signal 106 generated by the shape locator 50 is optionally provided to an eyes-nose-mouth (ENM) region detector 52, as shown in FIG. 7. The ENM region detector 52 receives the coordinates of the well-fitted elliptical outlines from the shape locator 50 and segments the elliptical region into a rectangular window 60 and a compliment area 62 (containing the remainder of the ellipse not located within rectangular window 60), as shown in FIG. 8. The ENM region detector 52 receives the elliptical parameters and processes them such that a rectangular window 60 is positioned to capture the region of the ellipse corresponding to the eyes, nose and mouth region.

The ENM region detector 52 determines a search region for locating rectangular window 60 using the search region identifier 108, where the coordinates of the center point ($x_0$, $y_0$) of the elliptical outline as shown in FIG. 8 are used to obtain estimates for the positioning of the rectangular window 60. The search region for locating the center point of the ENM region is a rectangle of size S×T pixels such as, for example, 12×15 pixels, and is advantageously chosen to have a fixed size relative to the major and minor axes of the elliptical shape outline. The term major axis as used in this disclosure is defined with reference to FIG. 8 and refers to the line segment bisecting the ellipse between points $y_1$ and $y_2$. The term minor axis as used in this disclosure is also defined with respect to FIG. 8 and refers to the line segment bisecting the ellipse between points $x_1$ and $x_2$. As an illustrative example, assume the ellipse has a length along the major axis of 50 pixels and a length along the minor axis of 30 pixels. The size of the rectangular window 60 is advantageously chosen to have a size of 25×15 pixels, which approximates half the length of the ellipse along both the major and minor axes and captures the most probable location of the eyes-nose-mouth region of the shape.

Once rectangular window 60 is located within the ellipse, the search region scanner 110 analyzes the rectangular window to determine each candidate position for an axis of symmetry with respect to the eyes-nose-mouth region of the ellipse. For example, search region scanner 110, in a leftto-right fashion, selects each vertical row of pixels within rectangular window 60 using a line segment 64 placed parallel to the major axis, in order to search for an axis of symmetry, positioned between the eyes, through the center of the nose and halfway through the mouth. After the axis of symmetry is determined with respect to the facial axis, the ENM region detector 52 generates an ENM region signal 54 corresponding to the coordinates of the resulting eyes-nose-mouth region of the rectangular window 60. The ENM signal 54 notifies the tone detector 56 of the coordinates for the location of the eyes, nose, and mouth region of the object so that pixels not included in such region are excluded from subsequent color parameter analysis. It is advantageous for the eyes-nose-mouth region to be identified since such a region of the face contains skin color parameters as well as color parameters other than skin tone parameters, including for example, eye color parameters, eyebrow color parameters, lip color parameters, and hair color parameters. Identifying the skin color parameters in the eye-nose-mouth region improves the accuracy of the range of color parameters that are sampled, since the identification of the ENM region is a strong indication of the presence of a skin area. Also, computational complexity is advantageously reduced, because the ENM region is smaller than the well-fitted ellipse from which it is derived.

Detection of the eyes-nose-mouth region may also be affected when the subject does not look directly at the camera, which often occurs for example, in video teleconferencing situations. The ENM region detector 52 also includes detection of an eyes-nose-mouth region for an input video image where the subject does not directly face the camera, the subject has facial hair and/or wears eyeglasses. The ENM region detector 52 exploits the typical symmetry of facial features with respect to a longitudinal axis going through the nose and across the mouth, where the axis of symmetry may be slanted at an angle $\theta_1$, as shown in FIG. 8, with respect to the vertical axis of the image. For such slanted ellipses, the rectangular window 60 is rotated by discrete angle values about the center of the window, in order to provide robustness in the detection of the eye-nose-mouth region. Advantageously, angle $\theta_1$ has a value within the range of −10 degrees to 10 degrees.

Skin area detector 12 is optionally used in conjunction with a video coder/decoder (codec) such as video codec 10. The following explanation discusses the operation of skin area detector 12 with regard to the other component parts of video codec 10 as shown in FIG. 1. Video codec 10 includes video coder 22 and video decoder 24, where video coder 22 is controlled by coding controller 16. For coding operations the video codec 10 receives an input video signal 26, which is forwarded to the skin area detector 12 and video coder 22. The skin area detector 12 analyzes the input video signal as described above and provides information related to the location of skin areas to the coding controller 16. The video coder 22 codes the input video signal under the control of the coding controller 16 to generate an output coded bitstream 30, wherein the skin areas, identified using the above described skin area detector, are encoded with a higher number of bits than are areas that are not so identified. For example, a coding controller, such as coding controller 16, typically encodes and transmits only those discrete cosine transform (DCT) data components, which have a value above some threshold value (quantization factor). As an illustrative example, assume that an area of 16×16 pixels has data components whose values range from 1 to 16 and that the threshold value was selected to be 8. Then, the coding controller will only code those DCT data components whose values are above the threshold value of 8. However, in the embodiment of the present invention, the data components having values below the threshold value, for portions of the video signal that are identified as containing skin areas, now are encoded along with the data components having values above the threshold value. As a result, the areas of the video image that are identified as skin areas are encoded with a higher number of bits than areas that are not so identified. In one embodiment, the video coder 22 encodes the input video signal 26 using a source coder 32, a video multiplex coder 34, a transmission buffer 36, and a transmission coder 38 to generate the output coded bitstream 30.

For decoding operations, the video codec 10 receives an input coded bitstream 40. The video decoder 24 decodes the input coded bitstream 40 using a receiving decoder 42, a receiving buffer 44, a video multiplex decoder 46, and a source decoder 48 for generating the output video signal 50.

It should, of course be understood that while the present invention has been described with reference to an illustrative embodiment, other arrangements may be apparent to those of ordinary skill in the art.

The invention claimed is:

1. An apparatus for determining skin tone in a color video signal, the apparatus comprising:
   a locator for identifying objects of a desired shape from at least a portion of the color video signal; and
   a detector for analyzing at least one pixel from at least one of the identified objects of the desired shape to determine whether the analyzed pixel has a signal energy within a predetermined range indicative of a skin area.

2. The apparatus of claim 1, wherein the desired shape is a shape that is likely to contain a skin area.

3. The apparatus of claim 2, wherein the desired shape has an arc associated with a human shape.

4. The apparatus of claim 3, wherein the desired shape is elliptical.

5. The apparatus of claim 1, wherein the analyzed pixel has a luminance parameter indicative of the skin area, the luminance parameter comprising an alternating current (AC) signal energy component of the analyzed pixel.

6. The apparatus of claim 1, wherein the detector further samples the analyzed pixel to determine at least one color parameter of the pixel.

7. The apparatus of claim 6, wherein the at least one color parameter is a chrominance parameter.

8. The apparatus of claim 6, wherein the detector further includes a comparator which compares the determined at least one color parameter of the analyzed pixel with a plurality of color parameters in nonanalyzed pixels of the color video signal, to identify the plurality of color parameters in nonanalyzed pixels which are identical to the determined at least one color parameter of the analyzed pixel.

9. The apparatus of claim 6, wherein a coder generates a code segment based on the location of the at least one color parameter of the analyzed pixel.

10. The apparatus of claim 3, wherein the arc associated with the human shape is analyzed to determine whether the shape contains pixels associated with an eyes-nose-mouth (ENM) region.

11. The apparatus of claim 10, wherein the pixels not associated with the eyes-nose-mouth (ENM) region are excluded from analysis by the detector.

12. A method for determining skin tone in a color video signal, the method comprising the steps of:
   identifying objects of a desired shape from at least a portion of the color video signal; and analyzing at least one pixel from at least one of the identified objects of the desired shape to determine whether the analyzed pixel has a signal energy within a predetermined range indicative of a skin area.

13. The method of claim 12, wherein the desired shape is a shape that is likely to contain a skin area.

14. The method of claim 13, wherein the desired shape has an arc associated with a human shape.

15. The method of claim 14, wherein the desired shape is elliptical.

16. The method of claim 12, wherein the analyzed pixel has a luminance parameter indicative of the skin area, the luminance parameter comprising an alternating current (AC) signal energy component of the analyzed pixel.

17. The method of claim 12, further comprising the step of sampling the analyzed pixel to determine at least one color parameter of pixel.

18. The method of claim 17, wherein the at least one color parameter is a chrominance parameter.

19. The method of claim 17, further comprising the step of comparing the determined at least one color parameter of the analyzed pixel with a plurality of color parameters in nonanalyzed pixels of the color video signal, to identify the plurality of color parameters in nonanalyzed pixels which are identical to the determined at least one color parameter of the analyzed pixel.

20. The method of claim 17, further comprising the step of generating a code segment based on the location of the at least one color parameter of the analyzed pixel.

21. The method of claim 14, further comprising the step of analyzing the arc associated with the human shape to determine whether the shape contains pixels associated with an eyes-nose-mouth (ENM) region.

22. The method of claim 21, wherein the pixels not associated with the eyes-nose-mouth (ENM) region are excluded from analysis by the detector.

23. An apparatus for determining a skin area in an input color video signal and encoding an area determined to be a skin area with a higher number of bits, the apparatus comprising:

a shape locator for analyzing at least a portion of the color video signal to identify objects of a desired shape;

a tone detector for analyzing at least one pixel from at least one of the identified objects of the desired shape to determine whether the analyzed pixel has a luminance parameter with a signal energy within a predetermined range of signal energies indicative of a skin area; and a video controller for receiving an indication that said at least one identified object has been determined to have a luminance parameter with a signal energy indicative of a skin area and for controlling a video coder in response thereto to code said at least one identified object with a higher number of bits.

24. The apparatus of claim 23 wherein said portion of the color video signal comprises a frame and wherein the shape locator identifies all objects of a desired shape within the frame.

25. The apparatus of claim 24 comprising:

a color sampling processor to test the color of said at least one pixel.

26. The apparatus of claim 25 wherein said tone detector is further operable to determine non-skin areas and said video controller eliminates said non-skin areas from testing by the color sampling processor.

27. The apparatus of claim 23 wherein said signal energy is a sum of the squares of the luminance parameter.

28. The apparatus of claim 23 wherein all of the pixels of said analyzed object are sampled to determine a range of skin tone values for said analyzed object.

29. The apparatus of claim 28 wherein the range of skin tone values is compared with all tones contained in a video image to identify other areas having the same skin tone value.

30. A method for determining a skin area in an input color video signal and encoding an area determined to be a skin area with a higher number of bits, the method comprising the steps of:

analyzing at least a portion of the color video signal to identify objects of a desired shape;

analyzing at least one pixel from at least one of the identified objects of the desired shape to determine whether the analyzed pixel has a luminance parameter with a signal energy within a predetermined range of signal energies indicative of a skin area; and utilizing an indication that said at least one identified object has been determined to have a luminance parameter with a signal energy indicative of a skin area to control video coding so that said at least one identified object is coded with a higher number of bits.

31. The method of claim 30 wherein said portion of the color video signal comprises a frame and said first step of analyzing further comprises identifying all objects of a desired shape within the frame.

32. The method of claim 31 further comprising the step of:

testing the color of said at least one pixel.

33. The method of claim 32 further comprising the steps of:

determining non-skin areas; and eliminating said non-skin areas from color testing.

34. The method of claim 30 wherein said signal energy is a sum of the squares of the luminance parameter.

35. The method of claim 30 wherein all of the pixels of said analyzed object are sampled to determine a range of skin tone values for said analyzed object.

36. The method of claim 35 further comprising the step of:

comparing the range of skin tone values with all tones contained in a video image to identify other areas having the same skin tone value.

37. An apparatus for determining a skin area in an input color video signal and encoding an area determined to be a skin area with a higher number of bits, the apparatus comprising:

means for identifying objects of a desired shape from at least a portion of the color video signal;

means for analyzing at least one pixel from at least one of the identified objects of the desired shape to determine whether the analyzed pixel has a signal energy within a predetermined range indicative of a skin area; and means for receiving an indication that said at least one identified object has been determined to have a luminance parameter with a signal energy indicative of a skin area and controlling a video coder in response thereto to code said at least one identified object with a higher number of bits.

38. The apparatus of claim 37 wherein said portion of the color video signal comprises a frame and wherein the means for identifying objects of a desired shape identifies all objects of a desired shape within the frame.

39. The apparatus of claim 37 further comprising:

means for testing the color of said at least one pixel.

40. The apparatus of claim 39 wherein said means for analyzing to determine whether the analyzed pixel has a signal energy within a predetermined range indicative of a skin area is further operable for determining non-skin areas and said means for receiving and controlling is further operable for eliminating said non-skin areas from testing by the means for testing.

41. The apparatus of claim 37 wherein said signal energy is a sum of the squares of a luminance parameter for said at least one pixel.

42. The apparatus of claim 37 wherein all of the pixels of said analyzed object are sampled to determine a range of skin tone values for said analyzed object.

43. The apparatus of claim 42 wherein the range of skin tone values is compared with all tones contained in a video image to identify other areas having the same skin tone value.

* * * * *